US010131026B2

(12) United States Patent

Zheng et al.

(10) Patent No.: US 10,131,026 B2
(45) Date of Patent: Nov. 20, 2018

(54) DEVICE AND METHOD FOR MEASURING DIMENSIONS OF BACK BORING CUTTER

(71) Applicant: CITIC Dicastal CO., LTD, Qinhuangdao (CN)

(72) Inventors: Yao Zheng, Qinhuangdao (CN); Jiandong Guo, Qinhuangdao (CN); Weidong Liu, Qinhuangdao (CN); Bowen Xue, Qinhuangdao (CN); Xiaoguang Huang, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 215 days.

(21) Appl. No.: 15/337,607

(22) Filed: Oct. 28, 2016

(65) Prior Publication Data

US 2017/0120409 A1 May 4, 2017

(30) Foreign Application Priority Data

Oct. 30, 2015 (CN) .......................... 2015 1 0732179

(51) Int. Cl.
*B23Q 17/20* (2006.01)
*B23Q 17/09* (2006.01)
*B23B 29/034* (2006.01)

(52) U.S. Cl.
CPC ......... *B23Q 17/20* (2013.01); *B23Q 17/0919* (2013.01); *B23B 29/03403* (2013.01); *B23B 2270/48* (2013.01)

(58) Field of Classification Search
CPC ............................ B23Q 17/20; B23Q 17/0919
USPC .................................. 33/201, 626–643, 567
See application file for complete search history.

(56) References Cited

U.S. PATENT DOCUMENTS 2,330,692 A * 9/1943 De Vlieg ............ B23B 29/0341 33/628
2,730,810 A * 1/1956 Broden .............. B23Q 17/2225 33/637
4,329,785 A * 5/1982 Peterson ................ B23Q 17/24 33/201
4,646,441 A * 3/1987 Kearney .................. G01B 5/25 33/559
4,716,811 A * 1/1988 Johnson .................. F41A 23/50 24/495

(Continued)

*Primary Examiner* — G. Bradley Bennett
(74) *Attorney, Agent, or Firm* — Howard IP Law, PLLC; Jeremy Howard

(57) ABSTRACT

The present invention provides a device and method for measuring dimensions of a back boring cutter. The device is formed by a measuring portion (1), a connecting portion (2) and a clamping portion (6). The measuring portion (1) has a first horizontal through hole (7), a horizontal hole (5) and a vertical hole (4). The clamping portion (6) comprises a second horizontal through hole (7'), a side wall of the second horizontal through hole (7') is provided with a bolt hole (8), and a bolt (3) passes through the bolt hole (8) to install and fix a to-be-measured back boring cutter. One end of the connecting portion (2) is fixed on the measuring portion (1), while the other end is fixed on the clamping portion (6). The device and the method of the present invention have the advantages that simple measurement of important dimensions of the back boring cutter is realized, and dimension detection of the back boring cutter is simpler and more accurate.

5 Claims, 2 Drawing Sheets

(56) References Cited

U.S. PATENT DOCUMENTS

| | | | | |
|---|---|---|---|---|
| 7,464,478 | B2 * | 12/2008 | Adrian | B23B 49/00 33/286 |
| 8,550,413 | B2 * | 10/2013 | Warrick | A61J 1/16 248/229.22 |
| 8,857,776 | B2 * | 10/2014 | Chang | B65D 83/262 248/312 |
| 9,442,349 | B2 * | 9/2016 | Hyers | F16B 2/10 |
| 9,611,875 | B2 * | 4/2017 | Likosar | A63C 11/02 |
| 2014/0003862 | A1 * | 1/2014 | Shi | F16M 13/022 403/322.4 |
| 2015/0202729 | A1 * | 7/2015 | Lin | B23Q 17/2225 33/639 |
| 2015/0338457 | A1 * | 11/2015 | Bartley | G01R 31/2801 324/763.01 |
| 2016/0121447 | A1 * | 5/2016 | Dembeck | B25H 1/0021 33/638 |

* cited by examiner

DEVICE AND METHOD FOR MEASURING DIMENSIONS OF BACK BORING CUTTER

This application claims priority from CN 201510732179.4, filed on Oct. 30, 2015, the entire content of which is incorporated herein by reference.

TECHNICAL FIELD

The present invention relates to the field of machining, and in particular to a device and method for measuring dimensions of a back boring cutter.

BACKGROUND ART

A boring cutter is one of boring tools, and generally has a round shank; and a square cutter bar is also used for a large workpiece. The boring cutter is most often used for occasions of inner hole processing, reaming, profile modeling and the like. The boring cutter generally has one or two cutting portions, and is a cutter especially used for performing roughing, semifinishing or finishing on an existing hole. The boring cutter can be used on a boring machine, lathe or milling machine. The boring cutter is an indispensable important cutter in precision hole machining, and has the hole processing accuracy of level IT6 and the surface roughness of 'Ra 0.8 to 1.6 μm. The common type includes a micro-adjusting threaded boring cutter, a micro-adjusting eccentric boring cutter, a chute type double-edge boring cutter, a floating boring cutter and the like.

Due to the difference in clamping modes, a square shank, a Morse taper shank, a 7:24 taper shank and other forms are configured. The double-edge boring cutter has two teeth distributed on both sides of the center and used for cutting simultaneously. Because radial forces generated during cutting are balanced mutually and the cutting amount can be increased, the production efficiency is high. The double-edge boring cutter is divided into a floating boring cutter and a fixed boring cutter according to whether a blade floats on a boring bar or not. The floating boring cutter is suitable for hole finishing. The floating boring cutter is actually equivalent to a reamer, and is capable of boring a hole with high dimension precision and smooth surface, but is incapable of correcting linear deviation of the hole. To increase the number of times of regrinding, the floating boring cutter is often made into an adjustable structure.

After the cutter is installed, dynamic runout inspection is required. Dynamic runout inspection is a comprehensive index which reflects the machine tool spindle precision, the cutter precision and the connection precision between the cutter and the machine tool. If the precision exceeds ½ or ⅔ of the precision required by a to-be-machined hole, the hole will not be machined unless reasons are found out and problems are eliminated. This must be remembered and strictly executed by an operator. Otherwise, the machined hole is unsatisfactory. The life of each portion of the cutter is determined through a counting or detecting method so as to ensure the reliability of the machining precision. For a single-edge boring cutter, this requirement may be relatively low, but for a multi-edge boring cutter, this is especially important. An indexable boring cutter has the processing features that: the cutter is adjusted in advance; the requirement is achieved by primary processing; and no damage to the cutter must be ensured, otherwise unnecessary accidents may be caused.

Therefore, the accurate dimension measurement of the boring cutter is of important significance during production, and also has an important effect in judgment of the life of the boring cutter. In daily production, it is very difficult to measure the dimensions of the boring cutter through a vernier caliper due to the special shape of the boring cutter. The operator will face many difficulties in case of measurement through a manual method. When a three-coordinate measuring machine is used for measurement, the efficiency is very low and the cost is relatively high. Therefore, a device and method for measuring the dimensions of the boring cutter conveniently and quickly is urgently needed in the art.

SUMMARY OF THE INVENTION

Therefore, an object of the present invention is to provide a device and method for measuring dimensions of a back boring cutter conveniently and quickly.

To achieve the above object of the present invention, the present invention adopts the following method: according to the structural design of a back boring cutter, the back boring cutter is inserted into an appliance with a suitable shape and fixed, and subsequently, the dimensional data of the back boring cutter is measured from an opening of the appliance.

In one aspect of the present invention, a device for measuring dimensions of a back boring cutter is provided. The device is formed by a measuring portion (1), a connecting portion (2) and a clamping portion (6) and is characterized in that: the measuring portion (1) has a first horizontal through hole (7) along a vertical direction of the device for measuring dimensions of a back boring cutter, a horizontal hole (5) perpendicular to the first horizontal through hole (7) and communicating with the first horizontal through hole (7), and a vertical hole (4) perpendicular to and identical with the first horizontal through hole (7) and the horizontal hole (5); the diameter of the first horizontal through hole (7) is set to be greater than the radial diameter of a back boring cutter; the clamping portion (6) comprises a second horizontal through hole (7') which is set to be aligned with the first horizontal through hole (7); the diameter of the second horizontal through hole (7') is set to be greater than the radial diameter of a back boring cutter; a side wall of the second horizontal through hole (7') is provided with a bolt hole (8); a bolt (3) passes through the bolt hole (8) to install and fix a to-be-measured back boring cutter; and one end of the connecting portion (2) is fixed on the measuring portion (1), while the other end is fixed on the clamping portion (6).

In one preferable aspect of the present invention, the first horizontal through hole (7) and the second horizontal through hole (7') of the device for measuring dimensions of a back boring cutter are cylindrical through holes.

In one preferable aspect of the present invention, the horizontal hole (5) and the vertical hole (4) of the device for measuring dimensions of a back boring cutter are blind holes and ends of the horizontal hole (5) and the vertical hole (4) intersect at the first horizontal through hole (7).

In one preferable aspect of the present invention, the horizontal hole (5) and the vertical hole (4) of the device for measuring dimensions of a back boring cutter are open at a horizontal plane and a vertical plane.

In another aspect of the present invention, a method for measuring dimensions of a back boring cutter is provided, and is characterized in that the method comprises the steps: a back end of a to-be-measured back boring cutter is inserted into a second horizontal through hole (7') from a first horizontal through hole (7); the to-be-measured back boring cutter is adjusted so that an utmost front end of the back boring cutter is aligned parallel to an utmost front end of a measuring portion (1); the back boring cutter is fixed on a clamping portion (6) through a bolt (3); and the vertical dimension of the back boring cutter is measured with a depthometer through a horizontal hole (5) and a vertical hole (4).

The device and the method of the present invention have the advantages that simple measurement of important dimensions of the back boring cutter is realized, and dimension detection of the back boring cutter is simpler and more accurate.

BRIEF DESCRIPTION OF DRAWINGS

In the following, embodiments of the present invention are described in detail in combination with figures, wherein.

Figure 1:
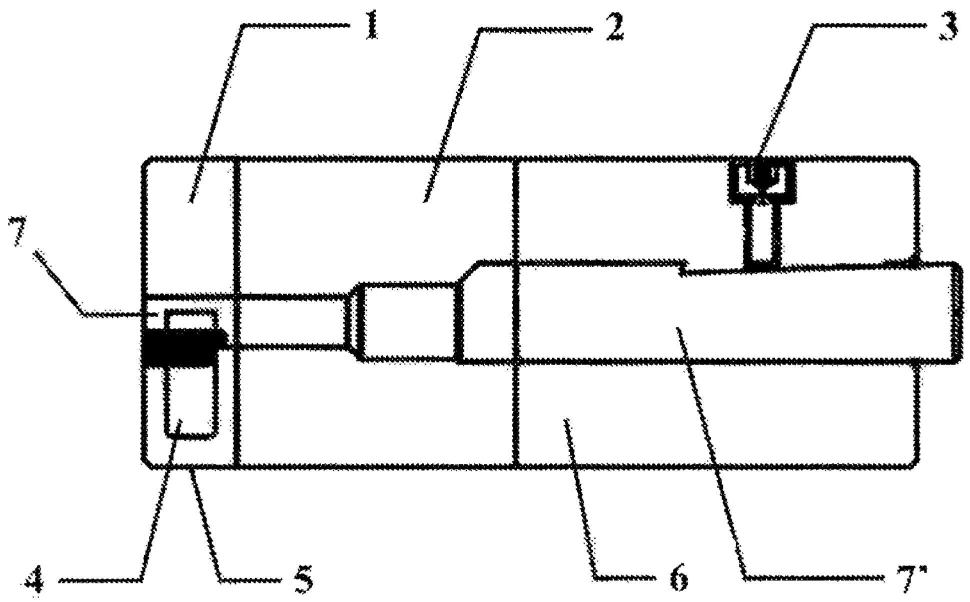
FIG. 1 is a top view of a device for measuring dimensions of a back boring cutter of Embodiment 1 of the present invention.
Figure 2:
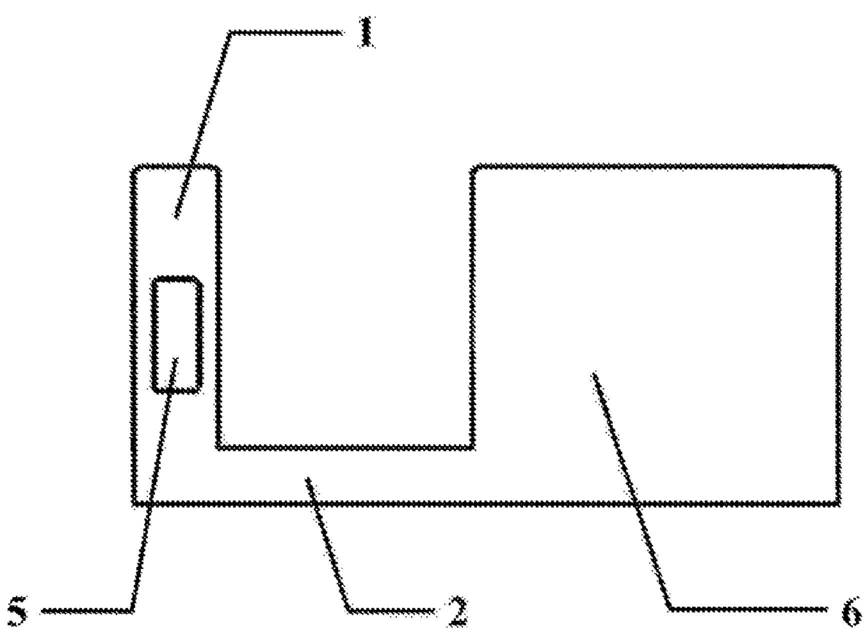
FIG. 2 is a side view of a device for measuring dimensions of a back boring cutter of Embodiment 1 of the present invention.
Figure 3:
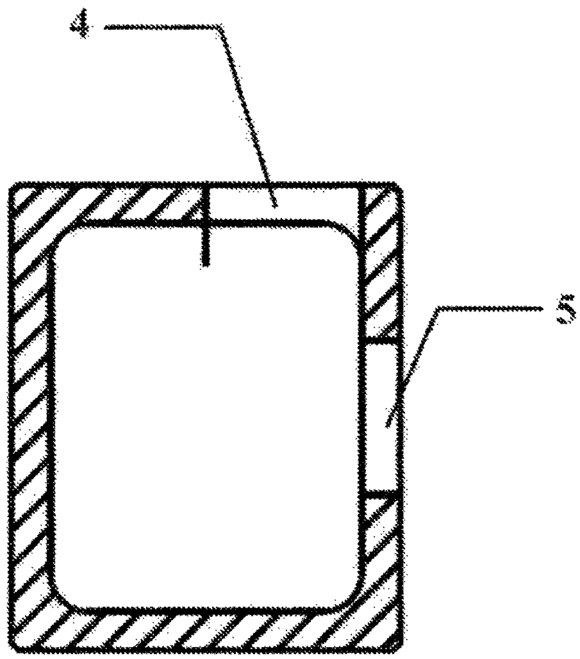
FIG. 3 is a sectional view of a measuring portion 1 of a device for measuring dimensions of a back boring cutter of Embodiment 1 of the present invention.
Figure 4:
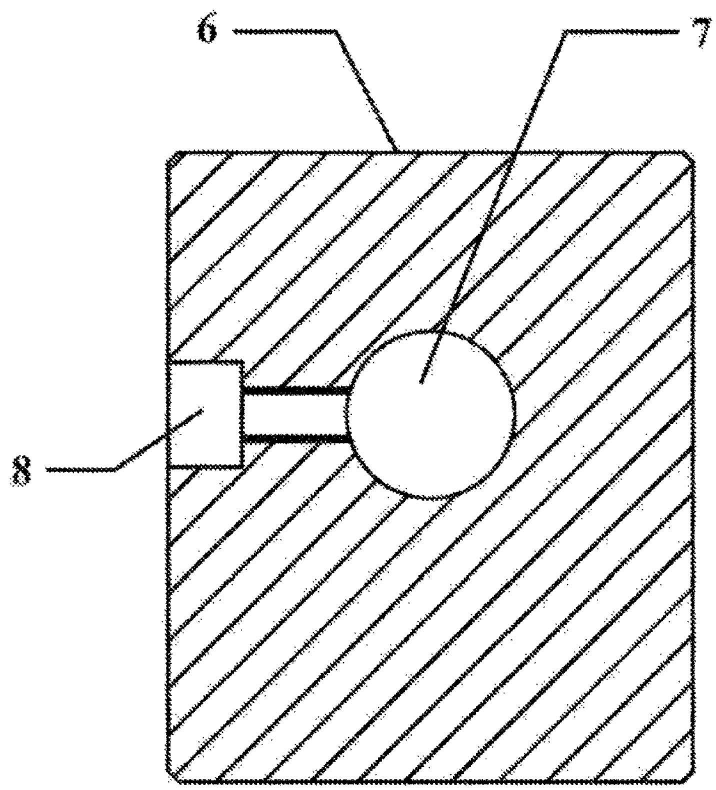
FIG. 4 is a sectional view of a clamping portion 3 of a device for measuring dimensions of a back boring cutter of Embodiment 1 of the present invention.

In the figures: 1-measuring portion, 2-connecting portion, 3-bolt, 4-vertical hole, 5-horizontal hole, 6-clamping portion, 7-first horizontal through hole, and 7'-second horizontal through hole.

DETAILED DESCRIPTION OF THE INVENTION

Embodiment 1

In one specific aspect of the present invention, a device is formed by a measuring portion (1), a connecting portion (2) and a clamping portion (6), and is characterized in that: the measuring portion (1) has a first horizontal through hole (7) along a vertical direction of the device for measuring dimensions of a back boring cutter, a horizontal hole (5) perpendicular to the first horizontal through hole (7) and communicating with the first horizontal through hole (7), and a vertical hole (4) perpendicular to and identical with the first horizontal through hole (7) and the horizontal hole (5); the diameter of the first horizontal through hole (7) is set to be greater than the radial diameter of a back boring cutter; the clamping portion (6) comprises a second horizontal through hole (7') which is set to be aligned with the first horizontal through hole (7); the diameter of the second horizontal through hole (7') is set to be greater than the radial diameter of a back boring cutter; a side wall of the second horizontal through hole (7') is provided with a bolt hole (8); a bolt (3) passes through the bolt hole (8) to install and fix a to-be-measured back boring cutter; and one end of the connecting portion (2) is fixed on the measuring portion (1), while the other end is fixed on the clamping portion (6). The first horizontal through hole (7) and the second horizontal through hole (7') are cylindrical through holes. The horizontal hole (5) and the vertical hole (4) are blind holes and ends of the horizontal hole (5) and the vertical hole (4) intersect at the first horizontal through hole (7). The horizontal hole (5) and the vertical hole (4) are open at a horizontal plane and a vertical plane.

When in use, the back boring cutter is fixed according to a certain position, and then the important dimensions of the back boring cutter are directly measured with a depthometer. A shank of the back boring cutter is put into the clamping portion (6) from the measuring portion (1) from left to right; the back boring cutter is adjusted so that an utmost front end of the back boring cutter is aligned parallel to an utmost front end of the measuring portion (1); then the back boring cutter is fixed on the clamping portion (6) through the bolt (3); and the vertical dimensions from benchmarks of the horizontal hole (5) and the vertical hole (4) to the back boring cutter are respectively measured with the depthometer.

The invention claimed is:

1. A device for measuring dimensions of a back boring cutter, formed by a measuring portion (1), a connecting portion (2) and a clamping portion (6), and characterized in that: the measuring portion (1) has a first horizontal through hole (7) along a vertical direction of the device for measuring dimensions of a back boring cutter, a horizontal hole (5) perpendicular to the first horizontal through hole (7) and communicating with the first horizontal through hole (7), and a vertical hole (4) perpendicular to and identical with the first horizontal through hole (7) and the horizontal hole (5); the diameter of the first horizontal through hole (7) is set to be greater than the radial diameter of a back boring cutter; the clamping portion (6) comprises a second horizontal through hole (7') which is set to be aligned with the first horizontal through hole (7); the diameter of the second horizontal through hole (7') is set to be greater than the radial diameter of a back boring cutter; a side wall of the second horizontal through hole (7') is provided with a bolt hole (8); a bolt (3) passes through the bolt hole (8) to install and fix a to-be-measured back boring cutter; and one end of the connecting portion (2) is fixed on the measuring portion (1), while the other end is fixed on the clamping portion (6).

2. The device for measuring dimensions of a back boring cutter of claim 1, characterized in that the first horizontal through hole (7) and the second horizontal through hole (7') are cylindrical through holes.

3. The device for measuring dimensions of a back boring cutter of claim 1, characterized in that the horizontal hole (5) and the vertical hole (4) are blind holes and ends of the horizontal hole (5) and the vertical hole (4) intersect at the first horizontal through hole (7).

4. The device for measuring dimensions of a back boring cutter of claim 1, characterized in that the horizontal hole (5) and the vertical hole (4) are open at a horizontal plane and a vertical plane.

5. A method for measuring dimensions of a back boring cutter using the device according to claim 1, the method comprising: inserting a back end of a to-be-measured back boring cutter into a second horizontal through hole (7') from a first horizontal through hole (7); adjusting the to-be-measured back boring cutter so that an utmost front end of the back boring cutter is aligned parallel to an utmost front end of the measuring portion (1); fixing the back boring cutter on the clamping portion (6) through a bolt (3); and measuring the vertical dimension of the back boring cutter with a depthometer through a horizontal hole (5) and a vertical hole (4).

* * * * *